United States Patent
Yamaya et al.

[15] 3,688,169
[45] Aug. 29, 1972

[54] BRUSHLESS MOTOR CONTROL APPARATUS FOR AN ELECTRIC VEHICLE

[72] Inventors: Taiji Yamaya; Minoru Okada, both of Kyoto, Japan

[73] Assignee: Nippon Yusoki Kabushiki Kaisha, Kyoto-fu, Japan

[22] Filed: Feb. 18, 1971

[21] Appl. No.: 116,359

[52] U.S. Cl.................................318/138, 318/376
[51] Int. Cl.............................................H02k 29/00
[58] Field of Search......318/138, 139, 171, 227, 341, 318/376

[56] References Cited

UNITED STATES PATENTS

| | | | |
|---|---|---|---|
| 3,548,275 | 12/1970 | Inagaki | 318/376 |
| 3,416,055 | 12/1968 | Toth | 318/138 |
| 3,497,783 | 2/1970 | Toth | 318/227 |
| 3,525,100 | 8/1970 | Duff | 318/227 |

*Primary Examiner*—Bernard A. Gilheany
*Assistant Examiner*—Thomas Langer
*Attorney*—Sughrue, Rothwell, Mion, Zinn & Macpeak

[57] ABSTRACT

Disclosed is a motor control circuit for use with a brushless motor which drives electric vehicles. The invention includes three, two phase chopper circuits which, during high rotation speed, operate as square wave inverter circuits.

6 Claims, 6 Drawing Figures

INVENTORS
TAIJI YAMAYA
MINORU OKADA

BY Sughrue, Rothwell, Mion,
Zinn & Macpeak
ATTORNEYS

BRUSHLESS MOTOR CONTROL APPARATUS FOR AN ELECTRIC VEHICLE

BACKGROUND OF THE INVENTION

1. Field of the Invention

This invention relates to a brushless motor control apparatus for an electric vehicle.

2. Description of Prior Art

A prior brushless motor control apparatus for electric vehicles consists, as shown schematically in FIG. 1 of a d.c. power source 1, a d.c. chopper 2, a variable frequency three phase inverter 3 and a brushless motor 4 connected in series, and an accelerator pedal 7, a firing circuit 6 and a circuit 5 for detecting the position of the rotor of the brushless motor. The firing circuit 6 is connected to the gate of each thyristor in the d.c. chopper 2 and the variable frequency three phase inverter 3.

In this known apparatus, the d.c. chopper 2 produces a direct current which has a repetition period and a turn-on time corresponding to actuation of the accelerator pedal. The variable frequency three phase inverter 3 converts this direct current into a square wave, three phase alternating current which has a frequency corresponding to the rotating velocity of the brushless motor 4. The alternating current of a variable frequency and voltage is supplied to motor 4. Accordingly, the rotating velocity of the brushless motor 4 is dependent upon the operation of the accelerator pedal.

This apparatus has the disadvantage that it tends to be fairly large in size because it requires a separate d.c. chopper 2 and the three phase inverter 3. In addition, its operation is often unstable due to commutation failure in the inverter 3. Further, the starting torque is small due to the fact that the alternating current supplied to the motor is a square wave current. Still, furthermore switching between power running and regeneration and between forward rotation and reverse rotation is effected by contact switching in the main circuit. This tends to cause erroneous operation due to contact wear and noise.

SUMMARY OF THE INVENTION

It is, therefore, a general object of this invention to eliminate these disadvantages in the known apparatus by providing a novel and useful control apparatus for a brushless motor for use in electric vehicles.

It is another object of the invention to provide a contactless brushless motor control apparatus thus eliminating the problems associated with contact wear and noise.

It is another object of the invention to provide a reliable brushless motor control apparatus in which a lasting failure in commutation rarely occurs. This is accomplished by employing a two phase chopper which is capable of self-recovery even in the presence of a commutation failure.

It is another object of the invention to provide a brushless motor control apparatus having an inverter which is capable of supplying an alternating current possessing a sinusoidal wave form to provide a large starting torque and in addition a square wave alternating current.

It is another object of the invention to provide a brushless motor control apparatus which affords a high regenerating efficiency to the motor. This is accomplished by providing two phase armature coils connected in series during regeneration thereby supplying a high regeneration voltage. This permits regeneration even at low speed.

It is another object of the invention to provide a brushless motor control apparatus in which the direction of electric current flowing through a field coil is the same during both power running and regeneration whereby supply of voltage during regeneration is made easier.

It is still another object of the invention to provide a compact brushless motor control apparatus by using three two phase choppers serving both as d.c. choppers and three phase inverters.

BRIEF DESCRIPTION OF THE DRAWINGS

Other features and advantages of the invention will become apparent from the description made herein below with reference to the appended drawing in which.

DETAILED DESCRIPTION OF A PREFERRED EMBODIMENT

Figure 2:
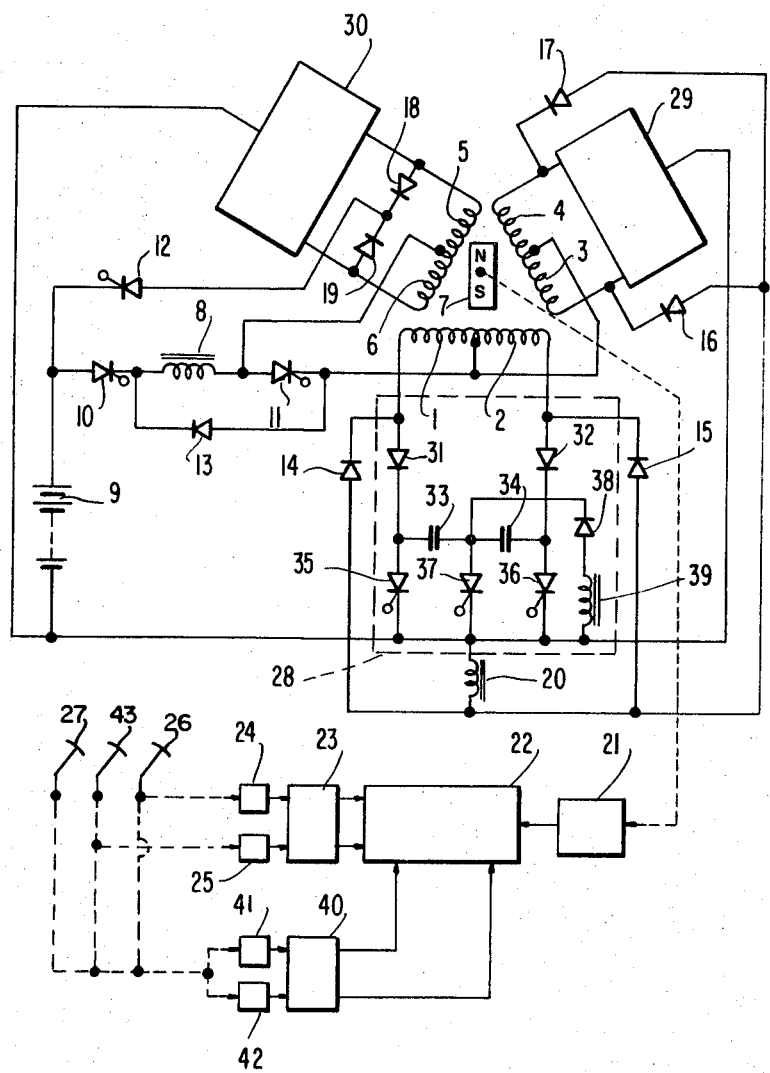
FIG. 2 is a circuit diagram showing one embodiment of a brushless motor control apparatus according to this invention.

In FIG. 2 a two-phase chopper 28 is connected between each half of the armature winding 1 and 2, divided in two halves and wound in parallel on the stator core of the brushless motor, and the negative terminal of the d.c. power source 9. The armature windings 1, 2 have an intermediate terminal. The two phase chopper 28 consists of reverse blocking diodes 31 and 32, provided for maintaining the commutation voltage at its highest value, commutating capacitors 33 and 34, main thyristors 35 and 36, a commutating thyristor 37, a commutating diode 38 and a commutating reactor 39. The reverse blocking diode 31 and the main thyristor 35 are connected in series. Blocking diode 32 and main thyristor 36 are also connected in series. These series connected elements are interconnected to each other at the cathodes of the main thyristors 35 and 36. Commutating capacitors 33 and 34 are connected in series between intermediate terminals provided respectively between the reverse blocking diode 31 and the main thyristor 35 and between the reverse blocking diode 32 and the main thyristor 36. Between an intermediate terminal, provided between the commutating capacitors 33 and 34, and the cathodes of the main thyristors 35 and 36 there are connected in series commutating diode 38 and the commutating reactor 39. In parallel therewith, is connected commutating thyristor 37.

A two phase chopper 29 is connected between each half of the armature winding 3 and 4 divided in two halves and wound in parallel on the stator core of the brushless motor, and the negative terminal of the d.c.

power source 9. The two phase chopper 29 is of the same construction as chopper 28. Armature windings 1 and 2 are connected in parallel with armature windings 3 and 4. The parallel connected armature windings are connected to the positive terminal of a d.c. power source 9 through a thyristor 11, a series exciting winding 8 of the brushless motor and a thyristor 10. The thyristors 10, 11 are provided for switching between power running and regeneration. A flywheel diode 13 is connected in parallel with the series exciting winding 8 and the thyristor 11.

The cathodes of the main thyristors of the two phase choppers 28, 29 are connected to the negative terminal of the d.c. power source 9. The cathode of rectifier diode 14, which is used for regenerative braking, is connected to an intermediate terminal between the armature winding 1 and the two phase chopper 28. Similarly, the cathodes of rectifier diodes 15, 16 and 17, also used for regenerative braking, are respectively connected to intermediate terminals between the armature winding 2 and the two phase chopper 28, the armature winding 3 and the two phase chopper 29 and the armature winding 4 and the two phase chopper 29. The anodes of diodes 14, 15, 16 and 17 are respectively connected to a reactor 20 which in turn is connected to the negative terminal of the d.c. source 9.

A two phase chopper 30 having the same construction as the two phase chopper 28 is connected to both terminals of the d.c. source 9 through regenerative braking rectifier diodes 18 and 19 and a thyristor 12 for switching between power running and regeneration. Armature windings 5 and 6 are connected in parallel between the two phase chopper 30 and an intermediate terminal between the series exciting winding 8 and the thyristor 11. Further, the commutation circuit of the two phase chopper 28 which consists of the thyristor 37, diode 38 and reactor 39 may also be used as commutation circuits of the other choppers 29 and 30.

The construction of the pulse circuit of the control apparatus will now be explained with reference to FIG. 2. Proximity switch 24 is used for detecting a forward rotation instruction while proximity switch 25 is used to detect a reverse rotation instruction. The proximity switch 24 is connected in series to an accelerator 26 and the proximity switch 25 is connected in series to an accelerator 43. These two circuits are connected in parallel. The proximity switches 24 and 25 are connected to a transistor locking circuit 23 and thence to a firing circuit 22. A proximity switch 41 for detecting a power running instruction and a proximity switch 42 for detecting a regeneration instruction are connected in parallel to the accelerator pedal 26 and a brake pedal 27. The proximity switches 41, 42 are connected to a transistor locking circuit 40 and thence to the firing circuit 22. A detecting circuit 21 for detecting the rotating position of a rotor 7 is connected to the firing circuit 22.

The operation of the control apparatus according to the invention will now be described. During power running, thyristors 10 and 11 are in an ON state while the thyristor 12 is in an OFF state. The two phase choppers 28, 29 and 30 connected respectively to the three phase armature windings 1 and 2, 3 and 4, and 5 and 6 operate as choppers having a repetition period divided each positive or negative half cycle into three equal periods of every 6° of electrical angle corresponding to the rotating position of the rotor 7 as shown in FIG. 3. Consequently, an intermediate repetition period has a half repetition period as compared with repetition periods of both sides thereof. That is, the frequency during the intermediate period is twice that which occurs during the 60° periods before and after the intermediate period, and an ON time corresponding to the actuation of the accelerator pedal 26. In this manner, the choppers apply to the armature windings sinusoidal three phase alternating voltages which are different in phase by 120° from one another and have a frequency varying with the rotation velocity of the rotor. In the two phase choppers 28 a first chopper is comprised of the d.c. power source 9, thyristors 10 and 11, series exciting winding 8, flywheel diode 13, armature winding 1, reverse blocking diode 31, main thyristor 35, commutating capacitor 33, commutating thyristor 37, commutating diode 38 and commutating reactor 39. The first chopper applies a positive half cycle voltage to the armature winding 1. Also in chopper 28 is a second chopper which is comprised of the d.c. power source 9, thyristors 10 and 11, series exciting winding 8, flywheel diode 13, armature winding 2, reverse blocking diode 32, main thyristor 36, commutating thyristor 37, commutating capacitor 34, commutating diode 38 and a commutating reactor 39. The second chopper applies a negative half cycle voltage to the armature winding 2. The two phase choppers 29 and 30 perform in the same manner as the two phase chopper 28.

Figure 1:
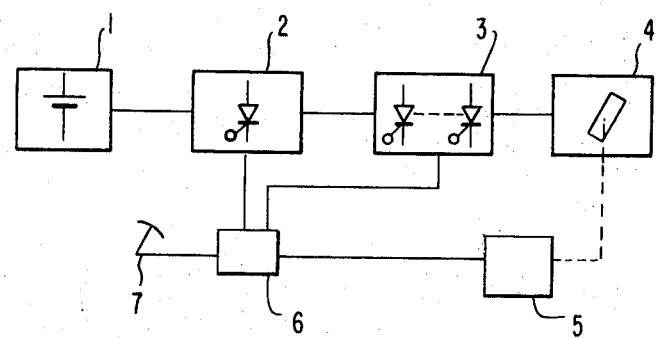
FIG. 1 is a schematic block diagram of the conventional brushless motor control apparatus of which description has already been made hereinabove.
Figure 3A:
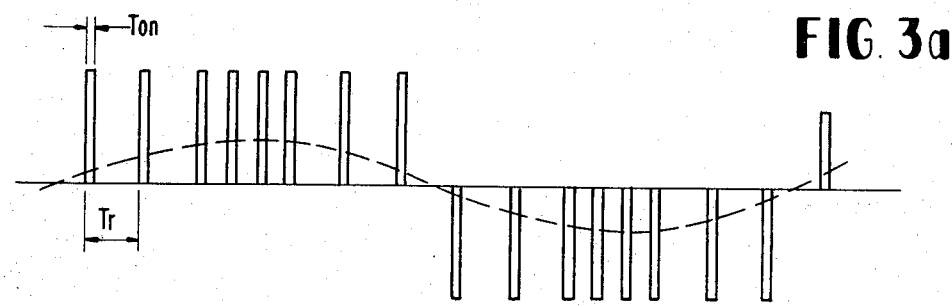
FIG. 3 shows a basic operating waveform for one phase of the three phase voltage produced in the control apparatus according to the present invention.
Figure 3B:
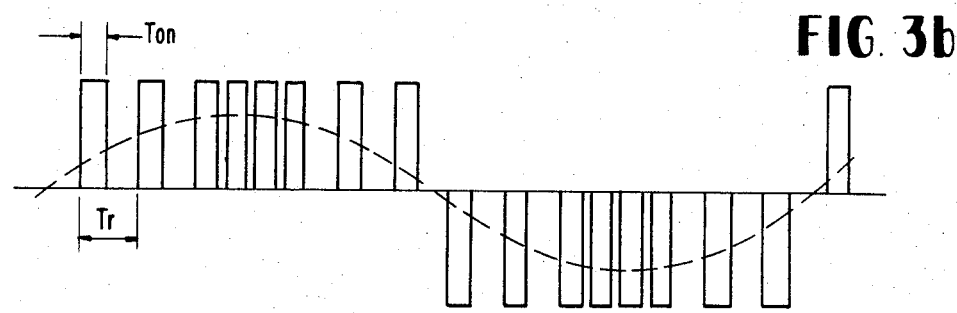
Figure 3C:
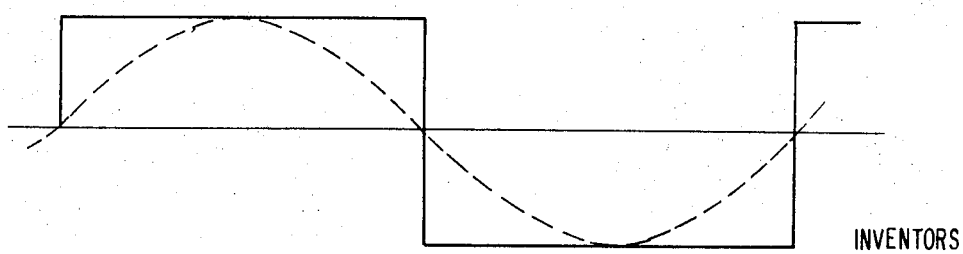

During a high speed rotation of the motor, the two phase choppers 28, 29 and 30 operate as square wave inverters applying square wave three phase alternating voltages each wave being different in phase by 120° from one another to the armature windings 1 and 2, 3 and 4 and 5 and 6 shown in FIG. 3C. The two phase chopper 28 then constitutes the square wave inverter with the d.c. power source 9, thyristors 10 and 11, series exciting winding 8, flywheel diode 13, armature windings 1 and 2, reverse blocking diodes 32 and 32, main thyristors 35 and 36 and commutating capacitors 33 and 34. The two phase inverters 29 and 30 perform in the same manner as the two phase inverter 28.

The switching operation from forward rotation to reverse rotation of the rotor will now be described. When a forward rotation instruction is given by the accelerator pedal 26, transistor locking circuit 23 is actuated by the proximity switch 24 causing firing circuit 22 to supply pulses, corresponding to the rotating position of the rotor and the actuation of the accelerator pedal 26, to each two phase chopper thereby operating each two phase chopper as described hereinabove. When a reverse rotation instruction is given by the accelerator pedal 43, the transistor locking circuit 23 is actuated by the proximity switch 25 to cause the firing circuit 22 to supply pulses, corresponding to the rotating position of the rotor and the actuation of the accelerator pedal 43, to each two phase chopper thereby operating each two phase chopper so as to produce a reverse armature current.

During regeneration, thyristors 10 and 11 are in an OFF state and thyristor 12 is in an ON state. Two phase choppers 28, 29 are in an OFF state and accordingly do not effect any chopping operation. Two phase chopper 30 only effects ON-OFF operation in response to the actuation of the accelerator pedal 26 or the brake pedal 27. Either the first chopper or the second chopper in the two phase chopper 30 effects the ON-OFF operation due to voltages generated at the armature windings 5 and 6 although the ON-OFF pulses are supplied simultaneously to both the first and the second choppers. When the two phase chopper 30 is in an ON state, a circuit consisting of the armature windings 1, 2, 3 and 4, diode 13, series exciting winding 8, armature winding 5 and 6, two phase chopper 30, reactor 20 and diodes 14, 15, 16 and 17 is formed to effect dynamic braking. When the two phase chopper 30 is in an OFF state, a circuit consisting of the armature windings 1, 2 and 3 and 4, diode 13, series exciting winding 8, armature winding 5 or 6, diode 18 or 19, thyristor 12, d.c. power source 9, reactor 20 and diodes 14, 15, 16 and 17 is formed to regenerate electric power to the d.c. power source 9.

Switching between power running and regeneration is effected by the following operation. When a power running instruction is given by the accelerator pedal 26, the transistor locking circuit 40 is actuated by proximity switch 41 causing the firing circuit 22 to supply pulses corresponding to the rotating position of the rotor and the actuation of the accelerator pedal to each two phase chopper thereby operating each two phase chopper as described hereinabove. When a regenerating instruction is given by the accelerator pedal 26 or the brake pedal 27, the transistor locking circuit 40 is actuated by the proximity switch 42 causing the firing circuit 22 to supply ON-OFF pulses to the two phase chopper 30 thereby operating the two phase chopper 30 as described hereinabove.

FIG. 3 shows a basic one phase waveform of the three phase voltage produced in the brushless motor control apparatus during running power. FIG. 3a, b and c respectively show voltage wave forms during a low speed rotation, a middle speed rotation and a high speed rotation. In the FIG. 3 T$on$ represents turn-on time of the main thyristor of the two phase chopper and T$r$ represents a repetition period. As has been described, the repetition period T$r$ is changed according to the rotating position of the rotor and the turn-on time T$on$ is changed according to the actuation of the accelerator pedal whereby an average voltage applied to the brushless motor is controlled.

Figure 4:
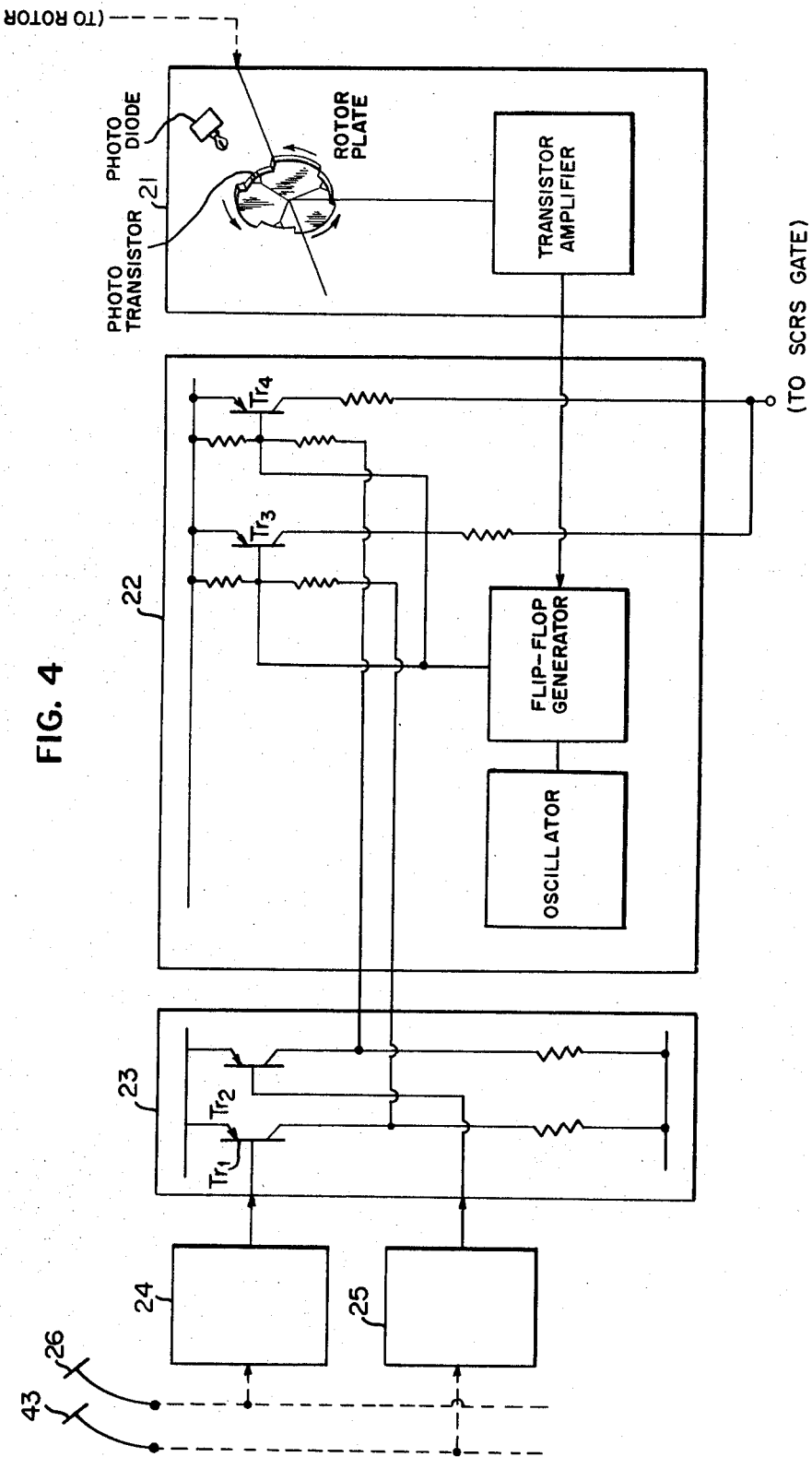
FIG. 4 illustrates specific examples of conventional devices used as proximity switches, transistor locking circuits, firing circuits and detecting circuits.

FIG. 4 illustrates specific examples of known devices used as the proximity switches 24, 25, 41 and 42, transistor locking circuits 23 and 40, firing circuit 22 and detecting circuit 21 respectively. Proximity switches 24, 25, 41 and 42, indicated as hollow rectangles, are used as a transducer for converting mechanical variations of the accelerator peddle into electrical signals. Such switches are conventional and widely used in tooling machines.

The operation of the circuitry of FIG. 4 will now be described.

For forward motion of the vehicle, forward motion transistor T$r_1$ in the locking circuit 23 is placed in its off-state by the actuation of the accelerator peddle 26 under the action of the proximity switch 24, while transistor T$r_3$ in firing circuit 22 is placed in its on state. Under this condition, the transistor T$r_3$ may amplify pulses generated from an oscillator included within the firing circuit 22. At the same time the oscillator operates a flip-flop generator which is also contained in the firing circuit 22 and connected to the oscillator and the detecting circuit 21, in response to an output from the detecting circuit 21 corresponding to the rotating position of the rotor 7. As a result, trigger pulses for the forward movement of the vehicle are supplied to each two phase chopper.

Thus, two phase choppers 28, 29 and 30 may supply to the armature windings 1 and 2, 3 and 4, and 5 and 6 sinusoidal three phase alternating voltages which are different in phase by 120° from one another and have a frequency varying with the rotational velocity of the rotor.

Although the invention has been described with respect to the preferred embodiments thereof, it is understood by those skilled in the art that various modifications can be made in construction and arrangement within the scope of the invention as defined in the appended claims.

What is claimed is:

1. A brushless motor control apparatus comprising first, second and third armature windings,
   a series exciting winding,
   a d. c. power source,
   first and second thyristors serially connected to said exciting winding,
   a first terminal of the first thyristor being connected to the positive terminal of the d. c. power source, a first terminal of the second thyristor being connected to an intermediate point on the first and second armature windings respectively, second terminals on said first and second thyristors being connected together to serially connect the first and second thyristors,
   means coupling the intermediate point on said third armature winding to a point between said exciting winding and said second thyristor,
   first and second diodes, serially coupled to each other in series opposition, said series connected diodes being connected in parallel across said third armature winding,
   a third thyristor, one terminal of which is coupled to an interconnecting point between said first and second diodes, and another terminal of the third thyristor being connected to the positive terminal of the d. c. power source,
   three, two phase, chopper circuits one coupled across each of said armature windings, each of said chopper circuits operating as a square wave inverter during high speed motor rotation, and
   control means for selectively turning on said first and second thyristors and turning off said third thyristor or turning off said first and second thyristor and turning on said third thyristor.

2. The apparatus of claim 1, wherein said each two phase chopper circuit comprises: a first chopper for supplying a positive half wave and a second chopper for supplying a negative half wave, said first and second choppers having common commutating elements.

3. The apparatus of claim 2, wherein said control means includes;
   firing circuit means for controlling the chopping operations of said two phase choppers, and
   accelerator means for partially controlling the operation of said firing circuit said firing circuit also being controlled by the position and rotating direction of the rotor of said motor.

4. The apparatus of claim 3 wherein said two phase choppers respectively comprise a first blocking diode and a first main thyristor connected in series, a second blocking diode and a second main thyristor connected in series, said first and second main thyristors being interconnected at their cathodes, two commutating capacitors connected in series between an intermediate terminal located between the first reverse blocking diode and the first main thyristor and an intermediate terminal located between the second reverse blocking diode and the second main thyristor, a commutating diode and a commutating reactor connected in series between an intermediate terminal located between the commutating capacitors and the cathodes of the main thyristors and a commutating thyristor connected in parallel with said commutating diode and said commutating reactor.

5. A brushless motor control apparatus including a d. c. power source for an electric vehicle comprising; a main circuit and a pulse circuit, said main circuit comprising armature windings (1, 2) connected in parallel to each other, a two phase chopper (28) connected between each half of armature windings (1, 2) divided into two halves which are wound in parallel on the stator core of the brushless motor and the negative terminal of the d. c. power source (9), said two phase chopper (28) including a reverse blocking diode (31) and a main thyristor (35) connected in series and a blocking diode (32) and a main thyristor (36) connected in series, said main thyristors (35, 36) being interconnected at their cathodes, commutating capacitors (33, 34) connected in series between an intermediate terminal located between the reverse blocking diode (31) and the main thyristor (35) and an intermediate terminal located between the reverse blocking diode (32) and the main thyristor (38) a commutating diode (38) and a commutating reactor (39) connected in series between an intermediate terminal located between the commutating capacitors (33, 34) and the cathodes of the main thyristors (35, 36) and a commutating thyristor (37) connected in parallel with said commutating diode (38) and said commutating reactor (39), armature windings (3, 4) connected in parallel with each other, a two phase chopper (29) having the same construction as the two phase chopper (28) and being connected in series to said armature windings (3, 4), said armature windings (1, 2) being connected to the positive pole of a d. c. power source (9) through a thyristor (11), a series exciting winding (8) a flywheel diode (13) connected in parallel with the series exciting winding (8) and the thyristor (11) and a thyristor 10, a diode 14 the cathode thereof being connected to an intermediate terminal between the armature winding (1) and the two phase chopper (28), a diode (15) the cathode thereof being connected to an intermediate terminal between the armature winding (2) and the two phase chopper (28), a diode (16) the cathode thereof being connected to an intermediate terminal between the armature winding (3) and the two phase chopper (29), a diode (17) the cathode thereof being connected to an intermediate terminal between the armature winding (4) and the two phase chopper (29), a reactor (20) connected between the anodes of said diodes (14, 15, 16, 17) and the negative pole of the d. c. power source (9), a two phase chopper (30) having the same construction as the two phase chopper (28) and being connected to both poles of the d. c. power source (9), diodes (18,19) connected in parallel to each other between the d. c. power source (9), and the two phase chopper (30), a thyristor (12) being connected in series between said diodes (18, 19) and the d. c. power source (9) and armature windings (5, 6) connected in parallel to each other between the two phase chopper (30) and an intermediate terminal between the series exciting winding (8) and the thyristor (11), said pulse circuit comprising accelerator pedals (26, 43) in parallel with each other, proximity switches (24, 25) connected in parallel with each other, said accelerator pedal (26) being connected in series to the proximity switch (24) and the accelerator pedal (43) being connected in series to the proximity switch (25), a transistor locking circuit (23), a firing circuit (22), said accelerator pedal (26), proximity switches (24, 25), transistor locking circuit (23) and a firing circuit (22) being connected in series, a brake pedal 27 connected in parallel with the accelerator pedal 26, proximity switches (41, 42) connected in parallel with each other to the accelerator pedal and the brake pedal, a transistor locking circuit (40) connected in series between the proximity switches (41, 42) and the firing circuit (22) and a detecting circuit (21) for detecting the rotating position of a rotor (7) being connected to the firing circuit (22).

6. A brushless motor control apparatus comprising
first, second and third armature windings
first, second and third combined chopper and square wave inverter circuits, one of said combined circuits being coupled to each of said armature windings, said combined circuits operating as square wave inverters at high rotational speeds of the motor and
switch means for turning on said first and second combined circuits and turning off said third combined circuit
to place said motor in a power summing state and for turning off said first and second combined circuits and turning on said third circuit to place said motor in a regeneration state.

* * * * *